US010474231B2

(12) United States Patent
Liu et al.

(10) Patent No.: US 10,474,231 B2
(45) Date of Patent: Nov. 12, 2019

(54) EYE TRACKING APPARATUS AND METHOD THEREOF (71) Applicant: Industrial Technology Research Institute, Hsinchu (TW)

(72) Inventors: Hsiao-Wei Liu, Hsinchu County (TW); Yu-Ying Lan, Hsinchu (TW); Hsin-Cheng Lin, Changhua County (TW); Chung-Lun Kuo, New Taipei (TW); Chia-Liang Yeh, Miaoli County (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 15/846,209

(22) Filed: Dec. 19, 2017

(65) Prior Publication Data

US 2019/0056781 A1 Feb. 21, 2019

Related U.S. Application Data (60) Provisional application No. 62/546,010, filed on Aug. 16, 2017.

(51) Int. Cl.
*G06F 3/01* (2006.01)
*G06K 9/00* (2006.01)
G06T 7/73 (2017.01)
G06F 21/32 (2013.01)
G02B 27/00 (2006.01)

(52) U.S. Cl.
CPC ......... *G06F 3/013* (2013.01); *G06K 9/00617* (2013.01); *G02B 27/0093* (2013.01); *G06F 21/32* (2013.01); *G06T 7/73* (2017.01); *G06T 7/74* (2017.01); *G06T 2207/30041* (2013.01); *G06T 2207/30201* (2013.01)

(58) Field of Classification Search
None
See application file for complete search history.

(56) References Cited

U.S. PATENT DOCUMENTS 7,444,007 B2 10/2008 Schonberg et al.
7,809,160 B2 * 10/2010 Vertegaal ............... A61B 3/113
345/157

(Continued)

FOREIGN PATENT DOCUMENTS

CN 106708251 5/2017
TW I557601 11/2016

OTHER PUBLICATIONS

Su Yeong Gwon, et al., "Gaze Tracking System for User Wearing Glasses," Sensors (Basel), Feb. 2014, pp. 2110-2134.

*Primary Examiner* — Michael J Jansen, II
(74) *Attorney, Agent, or Firm* — JCIPRNET (57) ABSTRACT An eye tracking apparatus and an eye tracking method for the eye tracking apparatus are provided. The eye tracking apparatus includes an image capture device and a computing device. The image capture device is adapted to capture at least one face image. The computing device is coupled to the image capture device. The computing device receives the face image to obtain an eye image and identifies at least one iris region of the eye image. The computing device chooses the largest iris region from the iris regions to obtain a fitting pattern of the largest iris region and obtains a gaze point of the eye image based on the fitting pattern.

22 Claims, 6 Drawing Sheets

(56) References Cited

U.S. PATENT DOCUMENTS

| | | | | |
|---|---|---|---|---|
| 7,963,652 B2* | 6/2011 | Vertegaal | ........... | G06K 9/00604 351/205 |
| 9,355,315 B2 | 5/2016 | Vugdelija et al. | | |
| 9,454,699 B2 | 9/2016 | Agrawal et al. | | |
| 9,465,991 B2 | 10/2016 | Mei et al. | | |
| 9,468,373 B2 | 10/2016 | Larsen | | |
| 9,471,763 B2* | 10/2016 | Norden | ................. | G06F 3/0488 |
| 9,704,038 B2* | 7/2017 | Wu | ....................... | G06K 9/0061 |
| 9,746,918 B2* | 8/2017 | Kempinski | ............. | A61B 3/113 |
| 9,773,170 B2* | 9/2017 | Vugdelija | ........... | G06K 9/6218 |
| 10,192,110 B2* | 1/2019 | Chen | .................... | G06K 9/0061 |
| 2005/0175218 A1* | 8/2005 | Vertegaal | ................ | A61B 3/113 382/103 |
| 2006/0110008 A1 | 5/2006 | Vertegaal et al. | | |
| 2008/0025575 A1* | 1/2008 | Schonberg | ......... | G06K 9/00597 382/117 |
| 2013/0188032 A1* | 7/2013 | Vertegaal | ................ | G06F 3/011 348/78 |
| 2013/0293467 A1* | 11/2013 | Norden | ................. | G06F 3/0488 345/158 |
| 2015/0002392 A1 | 1/2015 | Kempinski | | |
| 2015/0085250 A1* | 3/2015 | Larsen | ............... | G06K 9/00604 351/206 |
| 2015/0310253 A1* | 10/2015 | Agrawal | ............. | G06K 9/6218 382/103 |
| 2016/0026847 A1* | 1/2016 | Vugdelija | ............ | G06K 9/6218 382/103 |
| 2016/0042221 A1* | 2/2016 | Mei | ...................... | G06K 9/0061 382/103 |
| 2016/0196465 A1* | 7/2016 | Wu | ...................... | G06K 9/0061 382/203 |
| 2016/0259961 A1 | 9/2016 | Vugdelija et al. | | |
| 2016/0274659 A1* | 9/2016 | Caraffi | .................... | G06F 3/013 |
| 2017/0351899 A1* | 12/2017 | Chen | .................... | G06K 9/0061 |

* cited by examiner

EYE TRACKING APPARATUS AND METHOD THEREOF

CROSS-REFERENCE TO RELATED APPLICATION

This application claims the priority benefit of U.S. provisional application Ser. No. 62/546,010, filed on Aug. 16, 2017. The entirety of the above-mentioned patent application is hereby incorporated by reference herein and made a part of this specification.

TECHNICAL FIELD

The disclosure relates to an eye tracking apparatus and a method thereof.

BACKGROUND

As interactive apparatuses become much more popular nowadays, eye tracking technologies have become one of the important parts in the technologies of contact or non-contact interaction. The main working principle of eye tracking technologies is to capture an eye image by an image capture device, and identify a gaze point in the eye image as the basic interaction input information.

However, when a known image capturing apparatus captures an eye image, a contrast of the eye image may be insufficient, or an eye identifying feature may be shielded if glare caused by an external light source projecting light onto an eye region is captured or a light-transmitting medium, such as eyeglasses, a goggle, a protective mask, cosmetic lenses, contact lenses, or the like is present between the image capturing apparatus and the eye. Also, the contrast of the eye image may be insufficient due to various iris colors among different races. Thus, the glare, the insufficient contrast of the eye image, or the shielding of the eye identifying feature may possibly lead the eye tracking apparatus to misjudge the gaze point of the eye image and thus generate erroneous interaction input information.

SUMMARY

One or some exemplary embodiments of the disclosure provide an eye tracking apparatus and an eye tracking method adapted to exclude a gaze point misjudgment resulting from glare, an insufficient contrast of an eye image, or shielding of an eye identifying feature, so as to facilitate the accuracy of determining the gaze point.

According to an exemplary embodiment, an eye tracking apparatus includes an image capture device and a computing device. The image capture device is adapted to capture at least one face image. The computing device is coupled to the image capture device. The computing device receives the face image to obtain an eye image and identifies at least one iris region of the eye image. The computing device chooses the largest iris region from the at least one iris region to obtain a fitting pattern of the largest iris region, and obtains a gaze point of the eye image based on the fitting pattern.

According to an exemplary embodiment, an eye tracking method includes the following. At least one face image is captured. An eye image of the face image is obtained. At least one iris region in the eye image are identified. A largest iris region is chosen from the at least one iris region to obtain a fitting pattern of the largest iris region. A gaze point of the eye image is obtained based on the fitting pattern.

Based on the above, in the eye tracking apparatus and the eye tracking method according to the embodiments of the disclosure, the largest iris region is chosen, and the fitting pattern of the largest iris region is obtained, so as to obtain the gaze point of the eye image based on the fitting pattern and thereby facilitate the accuracy of identifying the gaze point.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1:
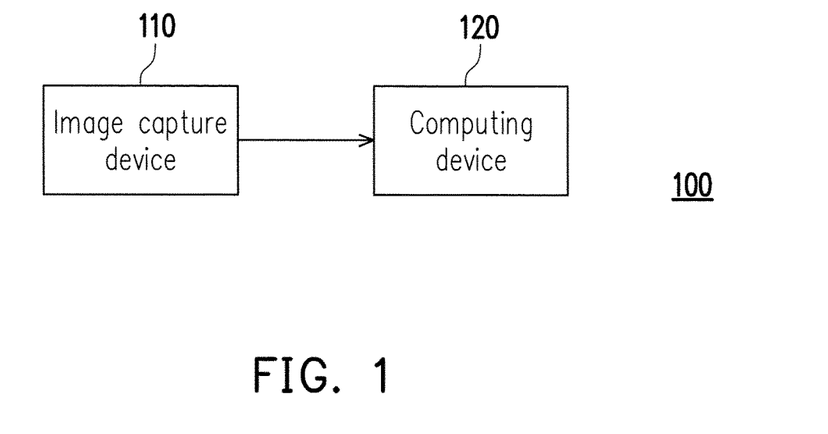
FIG. 1 is a schematic view illustrating an eye tracking apparatus according to an embodiment of the disclosure.
Figure 2:
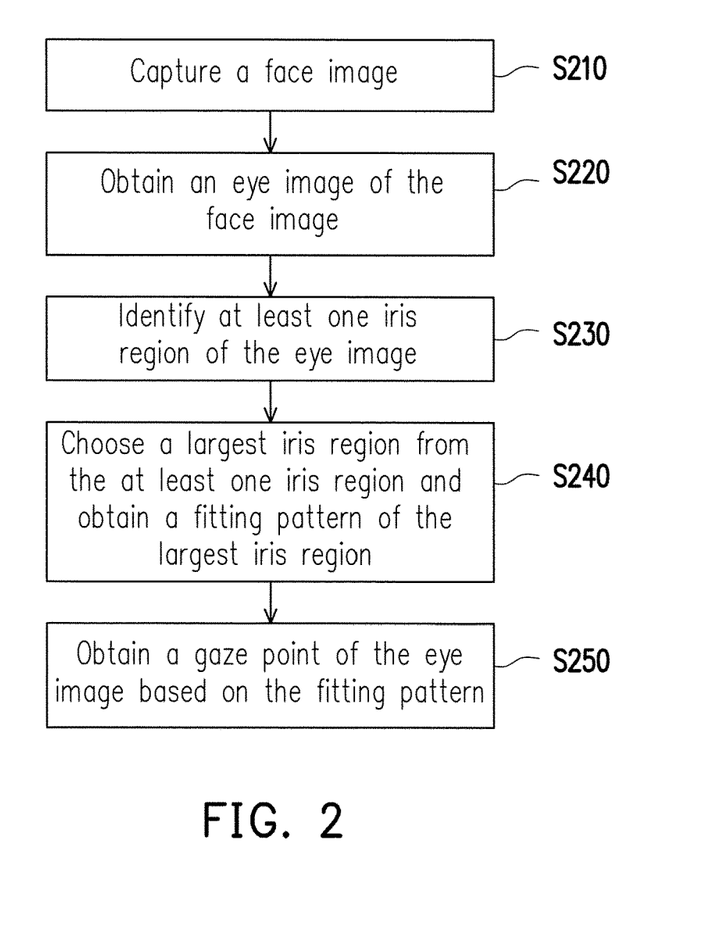
FIG. 2 is a flowchart illustrating an eye tracking method according to an embodiment of the disclosure.

Referring to FIGS. 1 and 2, FIG. 1 is a schematic view illustrating an eye tracking apparatus according to an embodiment of the disclosure, and FIG. 2 is a flowchart illustrating an eye tracking method according to an embodiment of the disclosure. In the embodiment of FIGS. 1 and 2, an eye tracking apparatus 100 includes an image capture device 110 and a computing device 120. At Step S210, the image capture device 110 captures at least one face image. In an embodiment, the face image may be included in a video streaming or not. The face image is not required to be an image with a complete face, and may be a partial face image including an eye image. The image capture device 110 may be a camera device such as a webcam, an industrial camera, an infrared camera, a color camera, or the like. The image capture device 110 may be a camera device including at least one cameras. In the embodiment, the face image may be a colored face image or a grayscale face image. In other words, the disclosure is not limited by the combination of colors of the face image.

The computing device 120 is coupled to the image capture device 110. The computing device 120 may be a central processing unit (CPU) or other programmable general-purpose or specific-purpose microprocessor, digital signal processor (DSP), programmable controller, application specific integrated circuit (ASIC), programmable logic device (PLD), other similar devices, or a combination thereof. The computing device 120 is capable of loading and executing a computer program to complete a corresponding operational function. In an embodiment, the computing device 120 may also achieve various operational functions through implementation of hardware circuits, and sufficient teaching, suggestions, and implementation details about the detailed steps and implementation are already provided in the common knowledge of the field.

Then, the computing device 120 may receive the face image captured by the image capture device 110 via wired or wireless communication. Means of wireless communication may include signal transmission based on the global system for mobile communication (GSM), the personal handy-phone system (PHS), the code division multiple access (CDMA) system, the wideband code division multiple access (WCDMA) system, the long term evolution (LTE) system, the worldwide interoperability for microwave access (WiMAX) system, the wireless fidelity (Wi-Fi) system, or the Bluetooth system.

At Step S220, the computing device 120 obtains the eye image from the face image. At Step S230, the computing device 120 identifies at least one iris region in the eye image. The iris is not necessarily present in all the iris regions. In other words, in the at least one iris region of the eye image, one or more iris regions may result from a misjudgment caused by glare, an insufficient contrast of the eye image, or shielding of an eye identifying feature. Thus, the at least one iris region of the embodiment may be considered as at least one iris region candidate. Based on a built-in classification parameter, such as a weighting value and a threshold value, the computing device 120 may classify based on the color and the grayscale value of the eye image, so as to sort out at least one iris region candidate through classification.

Figure 3A:
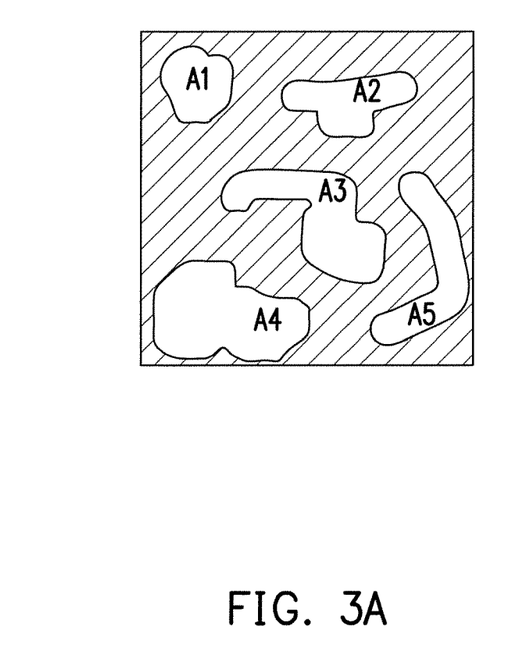
FIGS. 3A to 3C are schematic views illustrating identifying an iris region according to an embodiment of the disclosure.
Figure 3B:
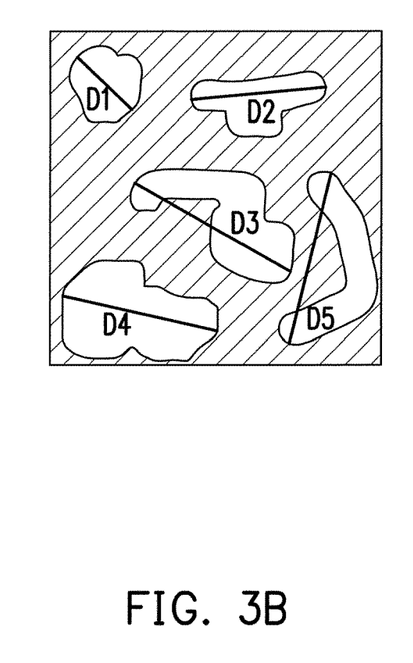
Figure 3C:
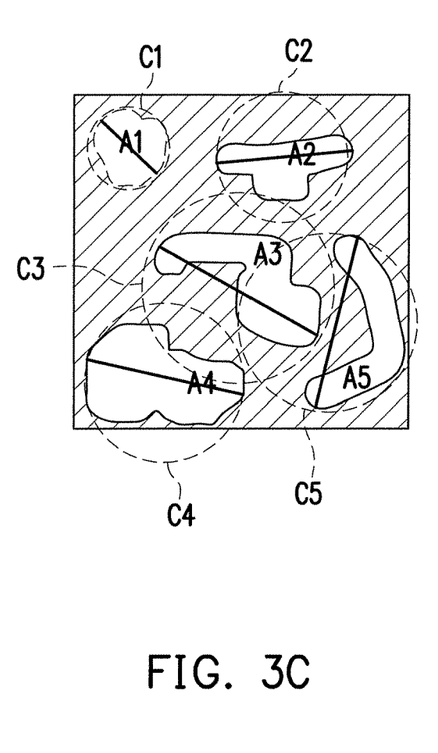

The glare, the insufficient contrast of the eye image, or shielding of the eye identifying feature may possibly result in a non-circular or non-elliptic irregular shape in the structures of the iris region candidates. Referring to FIGS. 3A to 3C as an example, FIGS. 3A to 3C are schematic views illustrating identifying an iris region according to an embodiment of the disclosure. In FIG. 3A, due to the glare, the insufficient contrast of the eye image, or the shielding of the eye identifying feature, five iris regions A1 to A5 in irregular shapes are generated.

Then, in FIG. 3B, based on a connected component labeling algorithm, the computing device may define main axes D1 to D5 of most significant directions of the respective iris region candidates A1 to A5. The connected component labeling algorithm may be a 4-connected algorithm or an 8-connected algorithm. In FIG. 3C, after defining the main axes D1 to D5 of the most significant directions of the respective iris region candidates A1 to A5, the computing device also calculates fitting patterns C1 to C5 of the respective iris region candidates A1 to A5. Then, based on radii of the fitting patterns C1 to C5 of the respective iris region candidates A1 to A5, the computing device may determine a largest fitting pattern of the fitting patterns C1 to C5 and recognize the largest fitting pattern as the iris region. Taking the embodiment as an example, the computing device may determine that the fitting pattern C3 is the largest fitting pattern, and the iris region corresponding to the fitting pattern C3 is recognized as the largest iris region.

Returning to the embodiment shown in FIGS. 1 and 2, at Step S240, the computing device 120 chooses the largest iris region from the at least one iris region. The largest iris region is the iris region where the iris is actually present. The computing device 120 defines the fitting pattern of the largest iris region on the largest iris region.

Figure 4:
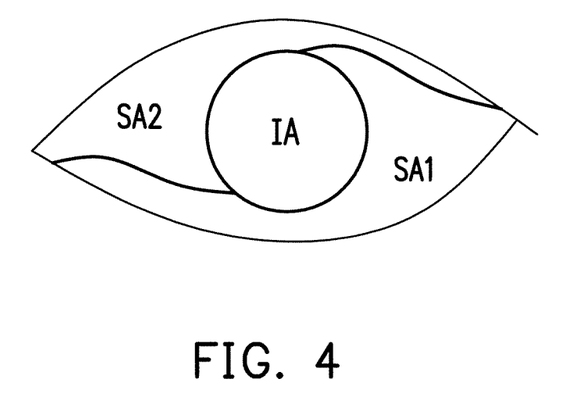
FIG. 4 is a schematic view illustrating an iris region and a non-iris region according to an embodiment of the disclosure.

Referring to FIG. 4, FIG. 4 is a schematic view illustrating an iris region and a non-iris region according to an embodiment of the disclosure. In a classification result of the embodiment, the computing device 120 may sort out a fitting pattern of a largest iris region IA of the eye image through classification and determine a region excluding the fitting pattern of the largest iris region IA in the eye image as the non-iris region. In the embodiment, the non-iris region is classified into sclera regions SA1 and SA2. The sclera regions SA1 and SA2 substantially surround the largest iris region IA. In other words, the sclera regions SA1 and SA2 indirectly provide a profile of the largest iris region IA. Thus, changes in shapes or areas of the sclera regions SA1 and SA2 may be helpful in determining a movement status of the largest iris region IA and assist to determine whether the obtained largest iris region IA is abnormal. The disclosure does not intend to impose a limitation on the number of the sclera regions.

Returning to the embodiment shown in FIGS. 1 and 2, At Step S250, the computing device 120 obtains a gaze point of the eye image based on the fitting pattern.

Figure 5:
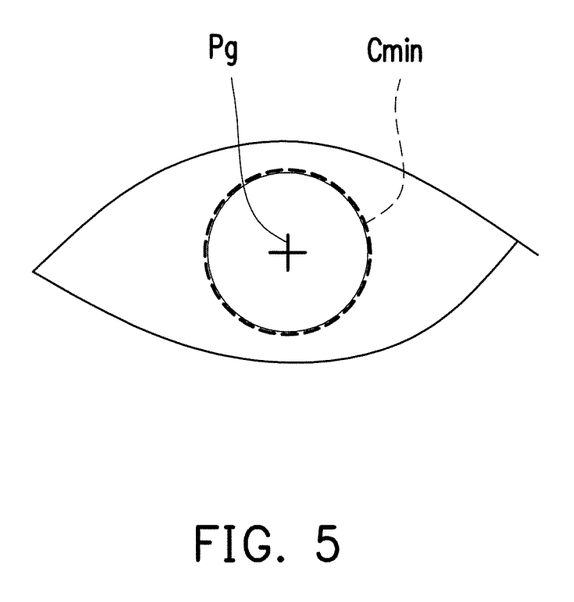
FIG. 5 is a schematic view illustrating a gaze point according to an embodiment of the disclosure.

Referring to FIG. 5, FIG. 5 is a schematic view illustrating a gaze point according to an embodiment of the disclosure. In the embodiment of FIG. 5, the fitting pattern of the largest iris region may be a minimum covering circle Cmin covering the largest iris region, and a gaze point Pg may be the center of the minimum covering circle Cmin covering the largest iris region. In other embodiments, the fitting pattern of the largest iris region may be a minimum covering ellipse covering the largest iris region, and the gaze point Pg may be a plurality of reference points, instead of a single reference point, in a region at the center of the minimum covering ellipse. In an embodiment, the fitting pattern of the largest iris region may be a minimum covering ellipse covering the largest iris region, and a gaze point may be the center of the major axis of the minimum covering ellipse covering the largest iris region.

In some embodiments, after obtaining the eye image, the computing device 120 may further mask regions excluding the eye image to omit identification on the regions excluding the eye image and thereby reduce computational loading of the computing device.

Figure 6:
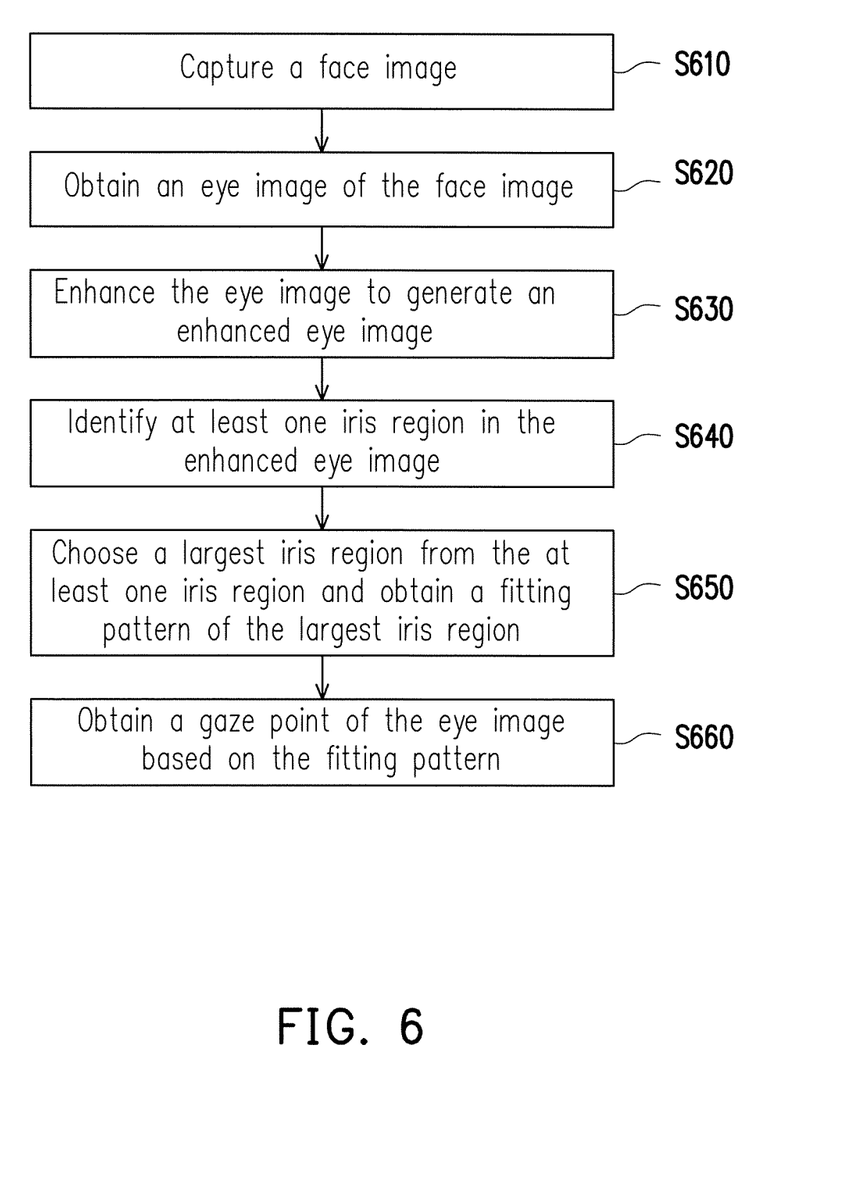
FIG. 6 is a flowchart illustrating an eye tracking method according to another embodiment of the disclosure.

Referring to FIGS. 1 and 6, FIG. 6 is a flowchart illustrating an eye tracking method according to another embodiment of the disclosure. The eye tracking method shown in FIG. 6 is adapted for the eye tracking apparatus 100. What differs from the embodiment of FIGS. 1 and 3 is that, in the embodiment of FIGS. 1 and 6, an image enhancing operation on the eye image is carried out at Step S630 after the computing device 120 obtains the eye image at Step S620. The image enhancing operation includes an image brightness adjustment operation, an image contrast increment operation and/or a Weickert image enhancing operation. The computing device enhances the eye image through the image enhancing operation, so as to define the at least one iris region in an enhanced eye image.

In the embodiment of FIGS. 1 and 6, the image brightness adjustment serves to increase a brightness at a position with an excessively low grayscale value in the eye image. In some embodiments, the image brightness adjustment serves to lower a brightness at a position with an excessively high grayscale value in the eye image. In another embodiment, the image brightness adjustment serves to increase a brightness at a position with an excessively low grayscale value in the eye image and lower a brightness at a position with an excessively high grayscale value in the eye image. In yet another embodiment, besides the brightness, if image resolution is too low, i.e. the eye image is relatively blurry, the eye image may be enhanced to improve edge information.

Then, the computing device 120 may perform the Weickert image enhancing operation on the eye image after the image brightness adjustment, so as to sequentially perform image processing processes, such as mean curvature flow, coherence enhancing diffusion, and Gaussian smoothing, on the eye image after the image brightness adjustment. Accordingly, the enhanced eye image becomes smoother and clearer, so the image quality is facilitated, and the glare and an iris signal-noise ratio are reduced. Thus, it becomes easier to identify the at least one iris region in the eye image.

In some embodiments, the computing device 120 may further mask the regions excluding the eye image after Step S630. In other words, the regions excluding the enhanced eye image are masked. In some embodiments, the computing device 120 may further mask the regions excluding the eye image before Step S630 and then perform the image enhancing operation on the eye image. The disclosure is not limited to the embodiment of FIG. 6.

In the embodiment of FIGS. 1 and 6, the flow in Steps S640 to S660 is the same as the flow in Steps S230 to S250 in the embodiment of FIGS. 1 and 2. Thus, details in this regard will not be repeated in the following.

Figure 7:
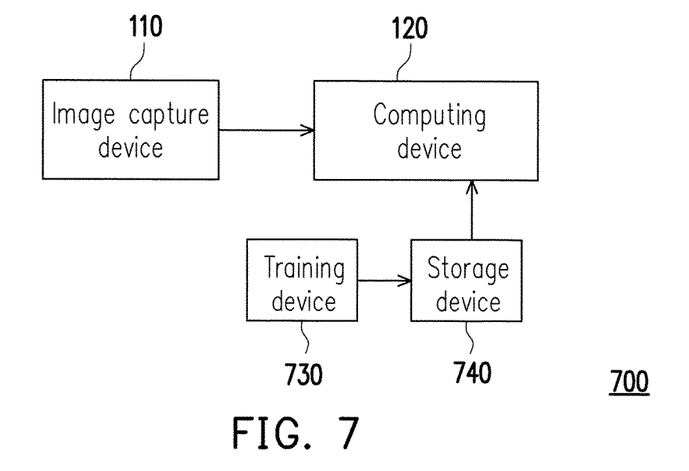
FIG. 7 is a schematic view illustrating an eye tracking apparatus according to another embodiment of the disclosure.
Figure 8:
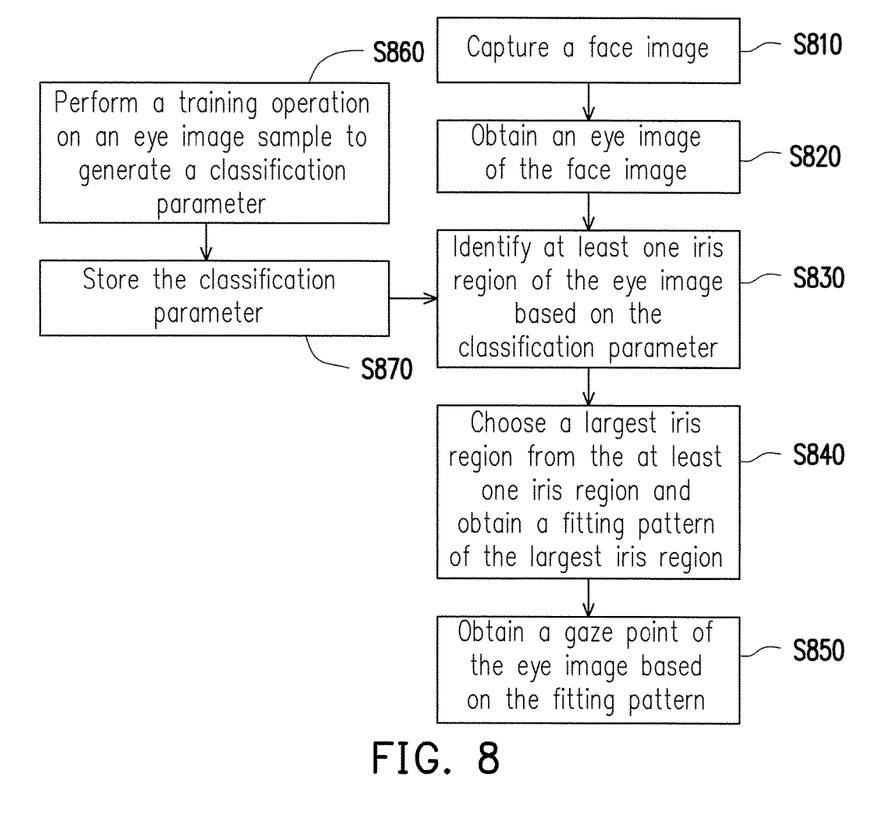
FIG. 8 is a flowchart illustrating an eye tracking method according to the embodiment of FIG. 7.

Referring to FIGS. 7 and 8, FIG. 7 is a schematic view illustrating an eye tracking apparatus according to another embodiment of the disclosure, and FIG. 8 is a flowchart illustrating an eye tracking method according to the embodiment of FIG. 7. What differs from FIG. 1 is that an eye tracking apparatus 700 of FIG. 7 further includes a training device 730 and a storage device 740. What differs from FIG. 2 is that FIG. 8 further includes Steps S860 and S870.

In the embodiment of FIGS. 7 and 8, the computing device 120 may perform a classification operation on the enhanced eye image. In the embodiment, the classification operation is based on multi-layer neural networks. The computing device 120 may classify colors and grayscale values of the eye image based on a built-in classification parameter CP, so as to sort out at least one iris region candidate through classification. After sorting out at least one iris region candidate through classification, the computing device 120 may choose a largest iris region candidate as the iris region from at least one iris region candidate. In model training based on the multi-layer neural networks, there is no limitation on whether the eye image is enhanced or whether the regions excluding the eye image are masked.

In the embodiment, the training device 730 is configured to perform a training operation on a collected eye image sample at Step S860 to generate the classification parameter CP. The storage device 740 is coupled to the training device 730 and the computing device 120 to store the classification parameter CP at Step S870. In addition, the computing device 120 may identify the at least one iris region in the eye image based on the classification parameter CP at Step S830. In the embodiment, different types of training for the eye image may be correspondingly performed based on different training scenarios or conditions such as different color tones of the iris.

For example, the training types may include at least one of the following: iris color, glasses worn, iris glare, eyeglass glare, cosmetic lenses worn, naked eyes, and ambient light sources, or an arbitrary combination thereof.

In the embodiment, training operations of different training types may result in corresponding classification parameters CP. For example, if the training device 730 performs the training operation based on an eye image sample with iris glare, a classification parameter CP1 with the maximum reliability with respect to iris glare may be generated. In another example where the training operation is performed based on an eye image sample whose iris is shielded by a cosmetic lens worn and glare is found on the cosmetic lens, a classification parameter CP2 with the maximum reliability under a condition that a user wears a cosmetic lens and glare is found on the cosmetic lens is generated.

In the embodiment, the training device 730 may be a central processing unit (CPU) or other programmable general-purpose or specific-purpose microprocessor, digital signal processor (DSP), programmable controller, application specific integrated circuit (ASIC), programmable logic device (PLD), other similar devices, or a combination thereof. The training device 730 is capable of loading and executing a computer program to complete a corresponding operational function. In an embodiment, the training device 730 may also achieve various operational functions through implementation of hardware circuits, and sufficient teaching, suggestions, and implementation details about the detailed steps and implementation are already provided in the common knowledge of the field. The storage device may be any kind of static or removable random access memory (RAM), read-only memory (ROM), flash memory, other similar devices, or a combination thereof.

In some embodiments, the eye image of the face image may serve as the eye image sample.

In some embodiments, the training device 730 may perform a training operation of a fixed training type on a single eye image sample to generate the classification parameter CP. In some embodiments, the training device 730 may perform a training operation of a fixed training type on a plurality of eye image samples to generate one or more sets of classification parameters CP. In some embodiments, the training device 730 may also perform training operations of a plurality of training types on a plurality of eye image samples to generate a plurality of sets of classification parameters CP. The disclosure does not intend to limit the numbers of the training types, the eye image samples, and the classification parameters CP.

In some embodiments, the eye tracking apparatus 700 may further include a plurality of training devices to obtain a plurality of sets of classification parameters CP. At Step S870, the training device 740 may receive the classification parameter CP generated by the training device 730 through wired or wireless communication. In some embodiments, the storage device 740 may be disposed inside the computing device 120.

In the embodiments of FIGS. 7 and 8, the computing device may decide whether to perform the image enhancing operation after Step S820. Then, Step S830 is carried out.

At Step S830, the computing device 120 may choose a classification parameter with the maximum reliability of at least one set of classification parameters from the storage device 740 based on a type of the eye image to identify the iris region in the eye image. The types of the eye image may include at least one of the following: iris color, glasses worn, iris glare, eyeglass glare, cosmetic lenses worn, naked eyes, and ambient light sources, or an arbitrary combination thereof. In the embodiment, the types of the eye image may be substantially similar to the training types. For example, when determining that the eye image has glare on the iris, the computing device 120 may choose the classification parameter CP1 with the maximum reliability with respect to iris glare from the storage device 740. In another example, when determining that a cosmetic lens shielding the iris is in the eye image, and glare is found on the cosmetic lens, the computing device 120 may choose the classification parameter CP2 with the maximum reliability under the condition that the user wears a cosmetic lens and glare is found on the cosmetic lens from the storage device 740. Accordingly, the accuracy of identifying the iris region is facilitated.

At Step S830, the computing device 120 generates at least one iris region candidate after identifying at least one iris region in the eye image based on a single set of classification parameters CP or the classification parameter CP with the maximum reliability.

In the embodiment of FIGS. 7 and 8, the flow in Steps S840 and S850 is already described in detail in the embodiment of FIGS. 1 and 2. Thus, details in this regard will not be repeated in the following.

Figure 9:
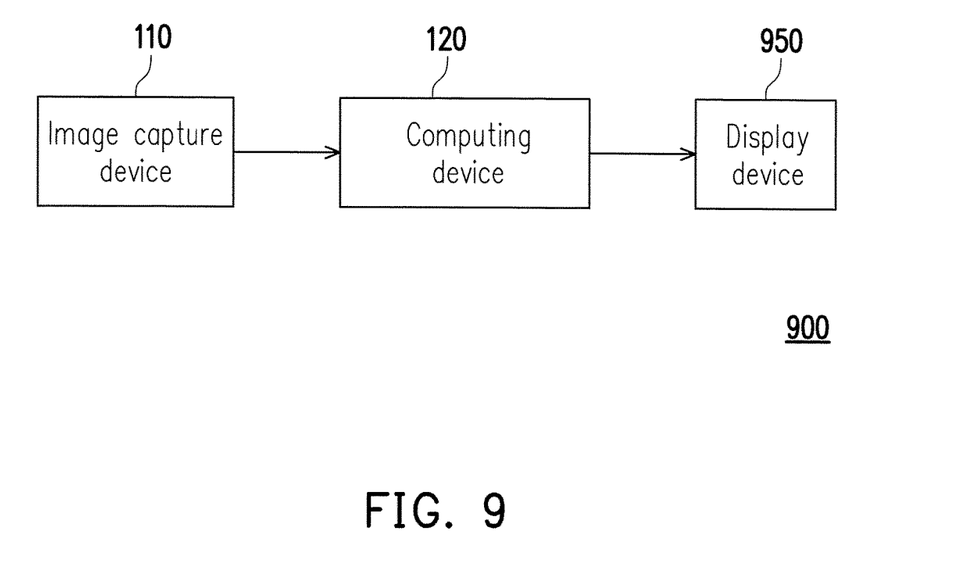
FIG. 9 is a schematic view illustrating an eye tracking apparatus according to yet another embodiment of the disclosure.

Referring to FIG. 9, FIG. 9 is a schematic view illustrating an eye tracking apparatus according to yet another embodiment of the disclosure. What differs from FIG. 1 is that an eye tracking apparatus 900 of FIG. 9 further includes a display device 950. The display device 950 is coupled to the computing device 120 and displays an output response based on the gaze point of the eye image. In the embodiment, the display device 950 may receive the gaze point of the eye image through a wired or wireless connection, and the output response corresponding to changes of the gaze point of the eye image may be a cursor, a scrolling direction of the frame, or an object moving direction. The display device 950 may be a display device with a display function, such as a liquid crystal display (LCD), a light emitting diode (LED) display, a field emission display (FED), an organic light emitting diode (OLED) display, an active-matrix organic light emitting diode (AMOLED) display, a flexible display, a transparent light emitted diode display, or the like.

Based on the above, in the eye tracking apparatus and the eye tracking method according to the embodiments of the disclosure, the eye image is captured by the image capture device. The computing device receives the face image to obtain the eye image, chooses the largest iris region in the eye image, obtains the fitting pattern of the largest iris region, and obtains the gaze point of the eye image based on the fitting pattern. Accordingly, the accuracy of identifying the gaze point is facilitated.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. An eye tracking apparatus, comprising:
   an image capture device, configured to capture at least one face image; and
   a computing device, coupled to the image capture device, receiving the face image to obtain an eye image, performing an image enhancing operation to enhance the eye image and thereby generate an enhanced eye image, and defines the at least one iris region in the enhanced eye image, identifying at least one iris region in the eye image, and choosing a largest iris region from a plurality of fitting patterns based on calculated radii of the plurality of fitting patterns; wherein a gaze point of the eye is a center of the fitting patterns,
   a training device, coupled to the computing device and configured to perform a training operation on an eye image sample to generate a classification parameter; and
   a storage device, coupled to the training device and the computing device, and configured to store the classification parameter, such that the computing device identifies the at least one iris region in the eye image based on the classification parameter.

2. The eye tracking apparatus as claimed in claim 1, wherein the image enhancing operation comprises an image brightness adjustment operation, an image contrast increment operation and/or a Weickert image enhancing operation.

3. The eye tracking apparatus as claimed in claim 2, wherein the image brightness adjustment comprises increasing a brightness at a position with an excessively low grayscale value in the eye image.

4. The eye tracking apparatus as claimed in claim 2, wherein the image brightness adjustment comprises lowering a brightness at a position with an excessively high grayscale value in the eye image.

5. The eye tracking apparatus as claimed in claim 1, wherein the training operation comprises model training based on multi-layer neural networks.

6. The eye tracking apparatus as claimed in claim 1, wherein the computing device defines the at least one iris region in the enhanced eye image based on the classification parameter.

7. The eye tracking apparatus as claimed in claim 1, wherein the computing device masks the enhanced eye image.

8. The eye tracking apparatus as claimed in claim 1, wherein the computing device classifies the eye image into the largest iris region and a non-iris region.

9. The eye tracking apparatus as claimed in claim 8, wherein the non-iris region comprises a first sclera region and a second sclera region assisting to position the largest iris region.

10. The eye tracking apparatus as claimed in claim 1, further comprising:
    a display device, coupled to the computing device and configured to display an output response based on the gaze point.

11. The eye tracking apparatus as claimed in claim 1, wherein the plurality of fitting patterns are minimum covering circles or minimum covering ellipses.

12. An eye tracking method, comprising:
    capturing at least one face image;
    obtaining an eye image of the face image;
    performing a training operation on an eye image sample to obtain a classification parameter;
    storing the classification parameter;
    identifying the at least one iris region in the eye image based on the classification parameter;
    performing an image enhancing operation to enhance the eye image and thereby generate an enhanced eye image, and defines the at least one iris region in the enhanced eye image;
    identifying at least one iris region with irregular shapes in the eye image;
    choosing a largest iris region from the at least one iris region and obtaining a plurality of fitting patterns of the largest iris region with the largest calculated radii from a plurality of fitting patterns; and
    obtaining a gaze point of the eye image based on a center of the fitting patterns.

13. The eye tracking method as claimed in claim 12, wherein the step of enhancing the eye image to generate the enhanced eye image comprises an image brightness adjustment operation, an image contrast increment operation and/or a Weickert image enhancing operation.

14. The eye tracking method as claimed in claim 13, wherein the image brightness adjustment comprises increasing a brightness at a position with an excessively low grayscale value in the eye image.

15. The eye tracking method as claimed in claim 14, wherein the image brightness adjustment comprises lowering a brightness at a position with an excessively high grayscale value in the eye image.

16. The eye tracking method as claimed in claim 12, wherein the training operation comprises model training based on multi-layer neural networks.

17. The eye tracking method as claimed in claim 12, wherein identifying the at least one iris region in the eye image comprises: identifying the at least one iris region in the enhanced eye image based on the classification parameter.

18. The eye tracking method as claimed in claim 12, wherein identifying the at least one iris region in the eye image further comprises:
   masking the enhanced eye image.

19. The eye tracking method as claimed in claim 12, wherein choosing the largest iris region from the at least one iris region and obtaining the fitting pattern of the largest iris region comprises:
   classifying the eye image into the largest iris region and a non-iris region.

20. The eye tracking method as claimed in claim 19, wherein the non-iris region comprises a first sclera region and a second sclera region assisting to position the largest iris region.

21. The eye tracking method as claimed in claim 12, further comprising:
   displaying a output response based on the gaze point.

22. The eye tracking apparatus as claimed in claim 12, wherein the plurality of fitting patterns are minimum covering circles or minimum covering ellipses.

* * * * *